United States Patent [19]
Neuhaus

[11] Patent Number: 5,832,446
[45] Date of Patent: Nov. 3, 1998

[54] INTERACTIVE DATABASE METHOD AND SYSTEM FOR FOOD AND BEVERAGE PREPARATION

[75] Inventor: Thomas Neuhaus, Trumansburg, N.Y.

[73] Assignee: Cornell Research Foundation, Inc.

[21] Appl. No.: 40,960

[22] Filed: Mar. 31, 1993

[51] Int. Cl.⁶ .................................................. G06F 17/60
[52] U.S. Cl. .............................. 705/1; 434/127; 705/15
[58] Field of Search ..................................... 364/400, 401, 364/419.19, 413.29, 709.03; 434/127

[56] References Cited

U.S. PATENT DOCUMENTS

| | | |
|---|---|---|
| 4,703,423 | 10/1987 | Bado et al. . |
| 4,780,599 | 10/1988 | Baus . |
| 4,807,169 | 2/1989 | Overbeck . |
| 5,109,482 | 4/1992 | Bohrman . |
| 5,237,157 | 8/1993 | Kaplan . |
| 5,241,671 | 8/1993 | Reed et al. . |

OTHER PUBLICATIONS

Neuhaus, Tom, "Fabulous: A Culinary Database" *Academic Computing*, Feb. 1989, pp. 32–54.

*Primary Examiner*—Robert A. Weinhardt
*Attorney, Agent, or Firm*—Salzman & Levy

[57] ABSTRACT

The present invention features a computerized, electronic cooking encyclopedia running on Sun SPARC stations. The computerized system and method provide a search tool for accessing information about a worldwide variety of foods and beverages. The program of the invention allows for searching recipes by culture, menu category, preparation method and ingredients. Information is provided about the degree of complexity, necessary equipment, cooking tips, any caveats proffered and restaurants that actually serve a given dish (along with their menus). The software includes accessing an extensive database having color illustrations. When a CD ROM video or audio library is accessed, animation and/or audio viewing and listening are made possible.

5 Claims, 15 Drawing Sheets

☐ Metric Wt.   ☐ Metric Vol.   ☐ English Wt.   ☐ English Vol.
Ingredients                    Amount          ☐ Percent Eggplant sliced lengthwise    908g
Pure Olive Oil                 105g
Ground Lamb                    1kg 134g
Yellow Onion Minced            29g
Minced Garlic                  8g
Tomato Sauce                   170g
Dry sherry                     115g
ground cinnamon                16g
salt                           18g ☑ Preparation  ☑ Equipment  ☑ Comments  ☑ Menus  ☑ Properties
      36            37            38         39        40

Moussaka — 45

Prep time: 90
Cook Temp: 350
Serves: 12
Portion Size: 1,200
Greece — 46

[Return]

This is a casserole typically found in all classes of Greek restaurants. In greece, the meat is usually ground lamb. Some cooks use layers of sliced potatoes with the eggplant, the potatoes are cheaper ... ← 46a ☐ Metric Wt. ☐ Metric Vol. ☐ English Wt. ☐ English Vol.
Ingredients                        Amount              Percent Eggplant sliced lengthwise         908g
Pure Olive Oil                     105g
Ground Lamb                        1kg 134g
Yellow Onion Minced                29g
Minced Garlic                      8g
Tomato Sauce                       170g
Dry sherry                         115g
ground cinnamon                    16g
salt                               18g 136  137  138  139  140
☐ Preparation ☐ Equipment ☐ Comments ☐ Menus ☑ Properties
Steps—48                                   Substeps—49

☐ Mise-en-place —— 48a
☐ Bake eggplant —— 48b
☐ Make Filling —— 48c
☐ Make Bechamel —— 48d
☐ Assemble —— 48e
☐ Bake —— 48f
☐ Present —— 48g Moussaka  45                                  Return Prep time: 90
Cook Temp: 350
Serves: 12                    Greece  46
Portion Size: 1,200

46a

This is a casserole typically found in all classes of Greek restaurants.
In greece, the meat is usually ground lamb. Some cooks use layers of
sliced potatoes with the eggplant, the potatoes are cheaper ...

50 —— ☐ CD ROM
        ☐ VIDEO

*Figure 7*

□ Metric Wt. □ Metric Vol. □ English Wt. □ English Vol.
Ingredients                    Amount         □ Percent Eggplant sliced lengthwise     908g
Pure Olive Oil                 105g
Ground Lamb                    1kg 134g
Yellow Onion Minced            29g
Minced Garlic                  8g
Tomato Sauce                   170g
Dry sherry                     115g
ground cinnamon                16g
salt                           18g

*36*  *37*  *38*  *39*  *40*
☑ Preparation □ Equipment □ Comments □ Menus ☑ Properties
   Steps—*48*                        Substeps—*49*

Moussaka  *45*

Prep time: 90
Cook Temp: 350
Serves: 12
Portion Size: 1,200

Greece *46*

Return

□ Mise-en-place
□ Bake eggplant
□ Make Filling
☒ Make Bechamel—*48d*
□ Assemble
□ Bake
□ Present

*49a*—1. Assemble ingredients
*49b*—2. Melt Bitter
*49c*—3. Add flour
*49d*—4. Stir and heat over low
*49e*—5. Stir in milk while
*49f*—6. Bring to a boil while
*49g*—7. Stir in parmesan
*49h*—8. Add egg yolks

*54*

*51*—□ CD ROM
     □ VIDEO

*Figure 8*

| ☐ Metric Wt. | ☐ Metric Vol. | ☐ English Wt. | ☐ English Vol. | | | | |
|---|---|---|---|---|---|---|---|
| Ingredients | | Amount | ☐ Percent | | | | Return |
| Eggplant sliced lengthwise | | 908g | | | Prep time: 90 | | |
| Pure Olive Oil | | 105g | | | Cook Temp: 350 | | |
| Ground Lamb | | 1kg 134g | | | Serves: 12 | | Greece |
| Yellow Onion Minced | | 29g | | | Portion Size: 1,200 | | |
| Minced Garlic | | 8g | | | | | |
| Tomato Sauce | | 170g | | At least half of this restaurant's food sales are for pizza. It is baked | | | |
| Dry sherry | | 115g | | in a wood fired oven. (wood is kept underneath pizza station) | | | |
| ground cinnamon | | 16g | | Note the marble surface which doesn't stick to pizza dough, this | | | |
| salt | | 18g | | minimizes the amount of flour needed to handle the dough. | | | |

☐ Preparation ☐ Equipment ☐ Comments ☐ Menus ☑ Properties ← 40
Location                                    Views ☐ House of Gyro
1. Bar
2. Coffee Station
3. Dining room
4. Pizza station
5. Stained glass window

INTERACTIVE DATABASE METHOD AND SYSTEM FOR FOOD AND BEVERAGE PREPARATION

FIELD OF THE INVENTION

The present invention pertains to a method and system for preparing foods and beverages, and, more particularly, to an interactive, computerized system having a unique program for accessing an extensive database that features information about foods and beverages. The system allows the user to observe the various steps and ingredients necessary to prepare a wide range of dishes and meals from all over the world. On advanced computer systems, the present methodology may include video, sound and verbal instructions to enhance both the learning and the visual perception of meal preparation.

BACKGROUND OF THE INVENTION

Preparation of foods and beverages at schools, culinary institutions and hotels can be difficult. This is particularly true where novices must be taught various skills in food preparation. Compounded to this, it must be realized that the sundry styles of cooking represent an integral part of each country's culture. Hence, mastering the special cooking techniques required in the preparation of different cultural foods and beverages can be difficult. Part of this problem stems from the fact that cooking schools usually teach only one style, namely, techniques of their own country. Consequently, although some chefs are taught more, most chefs learn only one method of preparing foods.

In the United States and other modern societies around the world, it is becoming increasingly important to be able to prepare diverse, multi-cultural foods for the sophisticated palate. The ability to access information in the preparation of these various foods is difficult; it often requires a great deal of research and investigation. In addition, textbooks often lack illustrations; in those texts that are illustrated, the pictures are usually black-and-white, due to expense.

In the past, the acquisition of exotic ingredients was an impediment in the preparation of certain cultural foods. With the advent of rapid transportation modes, however, these ingredients have now become more accessible, thereby providing a greater diversity of food and beverages for people.

A common problem in preparing meals utilizing exotic ingredients, however, is the fact that seasonal contingencies may still influence the decision to prepare particular foods or meals. Even a seasoned cook can often be perplexed when confronted with having to make a substitution of a similar dish or a different ingredient in a dish. As is evidenced, the textbook approach to teaching food preparation can be severely limited.

Textbooks do not always provide enough information when ingredients or proportions have to be changed to accommodate larger or smaller portions, a greater or fewer number of servings, or slightly different (i.e., altered) preparations.

The preparation of any given dish often involves a long series of steps, any one of which can be mishandled, leading to the possibility of an unintended effect or even an ill-prepared meal. Frequently, detailed steps in the preparation of a given food dish are not clearly described in textbooks. Textbook instructions may inform a food preparer to saute an ingredient for five minutes, for example, until "soft" or "golden brown". However, it is often difficult for a novice to understand the subtle difference between regular frying and sauteing.

The temperature and the amount of cooking time for any stage of food preparation can present a narrow window requiring precise control by a cook. The lack of interaction presented by the written page of a book is often inadequate in providing proper teaching tools. There are, additionally, instances where preparation techniques cannot be properly absorbed unless the culture is at least somewhat understood and appreciated. Even expert chefs who have learned their culinary techniques in a certain country may not be versed in the preparation of foods from other countries. In short, food preparation is truly an art which few have mastered.

At schools and hotels, it is often necessary to offer a wide food repertoire. Researching any particular preparation can very often be tedious, not to mention inconvenient. This involves the maintenance of large libraries and a working knowledge of where to look. Preparation itself also requires constant supervision by chefs and nutritionists.

The present invention is based on the knowledge that large amounts of data pertaining to food preparation can be stored on a database.

The current invention features a computerized method and system by which information about a great number of dishes and meals can be accessed and learned quickly. The computer program of the invention is not only useful as a teaching tool, but it also provides a significant hands-on methodology for the everyday preparation of dishes at hotels, catering establishments, food processing facilities, restaurants and other food preparation sites.

The invention incorporates a unique methodology by which various dishes and meals can be accessed by country of origin, main ingredient and type of dish (such as soup, entree, dessert, etc.). The invention provides cultural tips, as well as information about preparation of the many dishes contained in its database.

The invention also features information about the necessary utensils and cooking facilities required. It provides conversions for portion number and portion size. Alternative ingredients are also suggested.

An added, helpful feature of this invention is that it allows a nutritionist to plan meals with expert care. Compositional and nutritional breakdown of any given dish is provided. This aspect of the invention can serve as an immense boon in this era of the health-conscious consumer and those who believe in preventive health maintenance.

The invention provides visual and audio on-screen aids, whereby each of the steps of a preparation can be visually observed, either by still views or by animated video with sound. The program of the invention allows for split-screen viewing, so that one can observe different alternatives during the processing of any particular step of the preparation. The user is able to scroll through various sections of on-screen menus. The views can be supplied with voice instruction, as well as the sounds of cooking.

The user of the program can easily access information about any dish with respect to its complexity and the length of preparation. Information is also accessible with respect to garnishes, complementary dishes and wines. To ease food preparation, expert advice and helpful hints are also provided.

In summary, the present invention comprises a complete, comprehensive, interactive, hands-on system and method for the preparation of foods and beverages that will serve novice and expert alike. The invention is much more than an electronic cookbook. The invention is an electronic combination of a cooking encyclopedia and a master chef.

SUMMARY OF THE INVENTION

In accordance with the present invention, there is provided a computerized, electronic cooking encyclopedia running on Sun SPARC stations. The computerized system and method provide a search tool for accessing information about, literally, a worldwide variety of foods and beverages. The program of the invention allows for searching recipes by culture, menu category, preparation method and ingredients. Information is provided about the degree of complexity, necessary equipment, cooking tips, any caveats proffered and restaurants that actually serve a given dish (along with their menus). The software includes accessing an extensive database having color illustrations. When a CD ROM video or audio library is accessed, animation and/or audio viewing and listening are made possible by the provision of verbal instructions and the sounds involved in cooking. The software provides a hierarchical system whereby the user can branch through multiple paths to access cultural information, menu category, ingredients and preparation methods. Branching also allows for unit translation of each ingredient, viz., different proportions, substitutions, nutritional information, etc. Hypertext functions are provided for defining textual and pictorial words and concepts. Troubleshooting information is provided, with images and text to explain any potential difficulties in the preparation of the dish. The hierarchical system of the invention allows the computer screen viewer to branch within the screen window by clicking a mouse. Dishes can be searched according to their degree of complexity, country of origin, food preparation costs, garnishments and special or particular ingredients, as well as complementary dish items. The user can scroll through menus and access different screens, windows and data paths. In summary, the invention provides the user with information on food preparation in an easily accessible manner, information that, heretofore, has only been accessible after many hours of research, utilizing voluminous texts and manifold hours of expert instruction.

BRIEF DESCRIPTION OF THE DRAWINGS

A complete understanding of the present invention may be obtained by reference to the accompanying drawings, when considered in conjunction with the subsequent detailed description, in which:

FIGS. 1 through 6 are sequential views of the computer screen of the system shown in FIG. 1a, wherein a user can be "walked through" or guided in the selection of a particular dish that is to be prepared;

FIGS. 7 through 11 are views of the computer screen of the system illustrated in FIG. 1a, wherein the user can learn about the preparation of the dish selected during the excursion through the viewer screens of FIGS. 1 through 6;

FIG. 13 is a view of the computer screen depicting photos or videos of various restaurants serving the dish or menus as illustrated in FIGS. 7 through 12; and FIG. 14 is a flow diagram depicting the database structure and how it is accessed on the screen of the system of the invention, as illustrated in FIG. 1a.

DESCRIPTION OF THE PREFERRED EMBODIMENT

Generally speaking, the invention is for an interactive, computerized system for instructing individuals in the preparation of an enormous variety of dishes. The number and types of dishes that can be prepared using the inventive system are limited only by the information that can be contained in the database. At present, the database of the invention is quite extensive, featuring over 5,000 different dishes and 16,000 informational screens. This database is continuously being updated and improved, so that the system has become a living library of culinary information and instruction.

Figure 1:
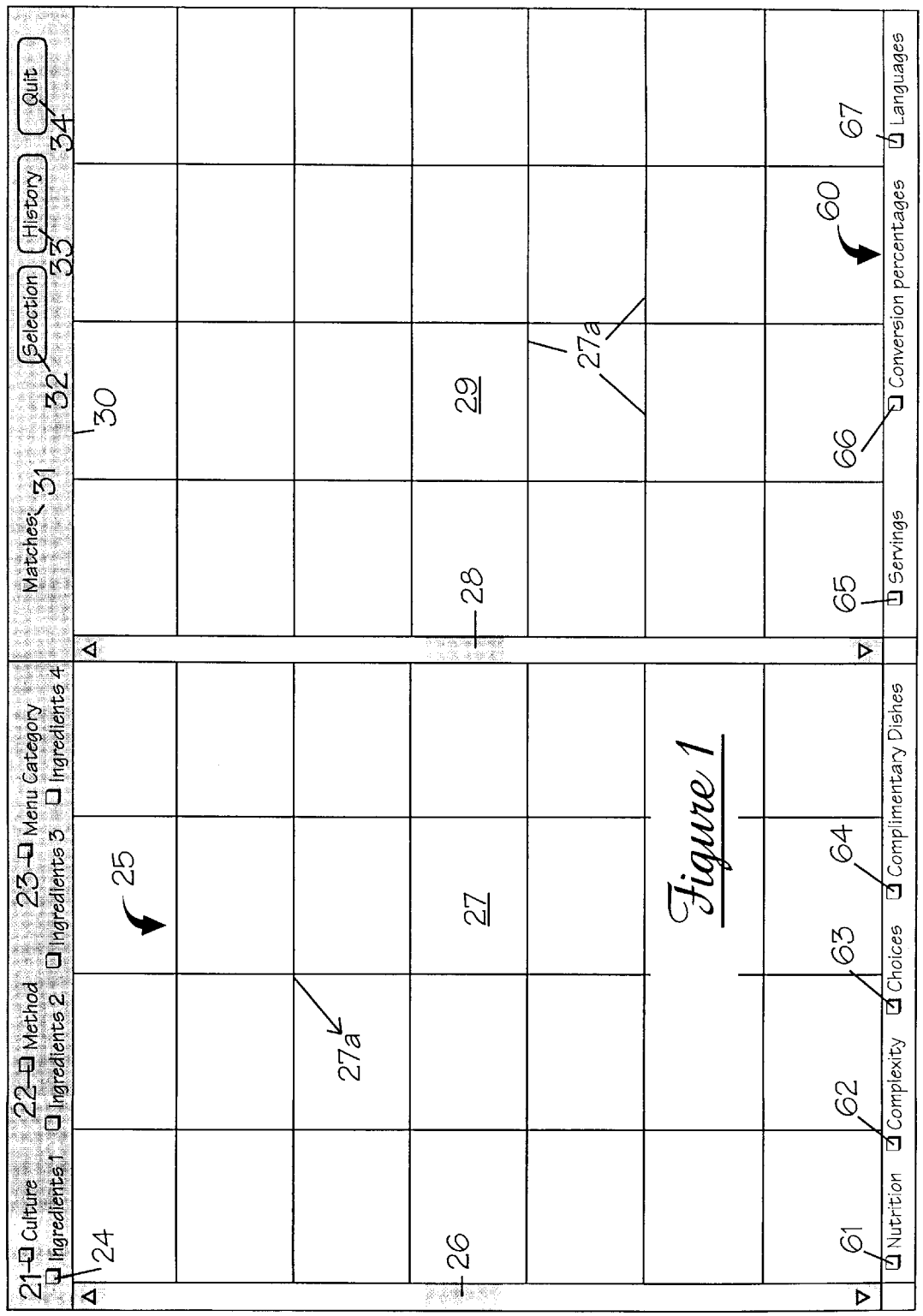
Figure 1A:
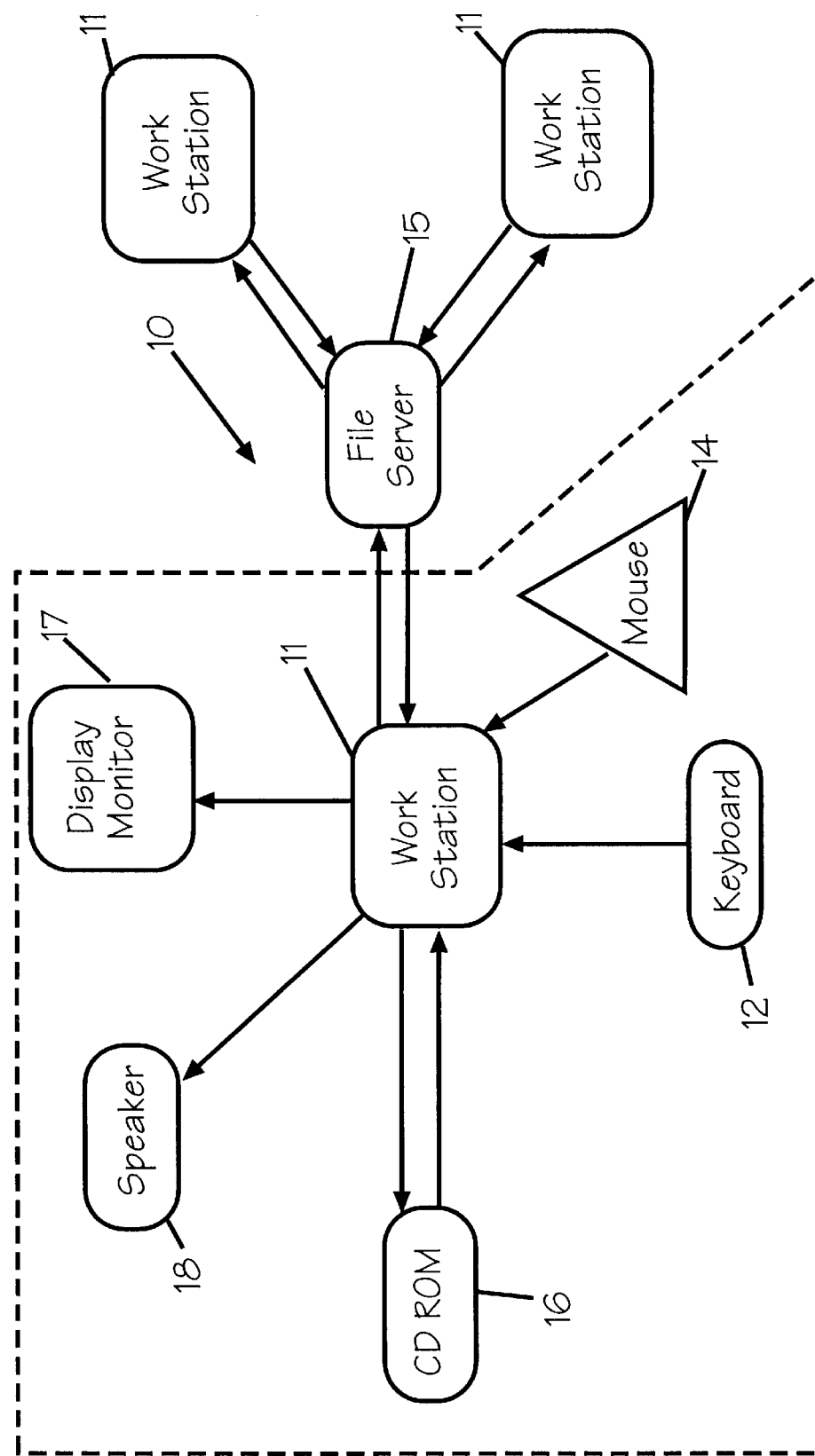
FIG. 1a is a schematic diagram of the computerized electronic cooking system of this invention.

Now referring to FIG. 1a, a schematic view of the computerized, interactive cooking system 10 of this invention is shown. The system 10 comprises a plurality of Sun SPARC stations 11, each of which is interlinked by an EtherNet communication link. One of the stations 11 can serve in the capacity of a file server 15 for the other three stations 11 that are shown. Each of the stations 11 has been programmed to provide for the access and display of a wide variety of cooking information. The user of a typical station 11, as illustrated by the dotted lines 20, can command the station 11 by means of the keyboard 12 or by a mouse 14. The station 11 can access data and information from the file server 15 and/or from a CD ROM video and/or audio library 16, where video and/or audio presentations are available on CD disc. The file server 15 contains more than 16,000 image files. All of the information obtained from the file server 15 or CD ROM video and/or audio library 16 can be displayed upon the display monitor 17 of each station and audibly perceived from attached speakers 18. The speakers can convey verbal instructions and/or the sounds of cooking and/or even appropriate music.

The monitor 17 will often display, in accordance with the program of the invention, a number of menu or scroll bars, icons, flags, buttons or other mouse-friendly information-accessing blocks. These accessing blocks can be clicked by the mouse 14 for easy acquisition of further information. The screen of the display monitor 17 is often split, making it easier to access and understand the information. For example, information about various dishes is displayed on one side of the screen, while photographs corresponding to the described dishes are displayed on the other side thereof.

The system 10 features a wide range of information that can be accessed quickly in a sequential or random manner, so that food preparation is made easy and enjoyable. The system provides the kind of performance that can display hundreds of images at an acceptable rate, because the user stations (processors) 11 have 12.5 MIP CPUs, with the EtherNet operating at 1.2 Mbytes per second. The processors 11 are also equipped with video cards and the programming necessary to adequately access and run video discs from the CD ROM video library 16.

The database contained in the file server 15 can be accessed by each of the processors 11 in two operating modes: (a) search and (b) browse.

Figure 2:
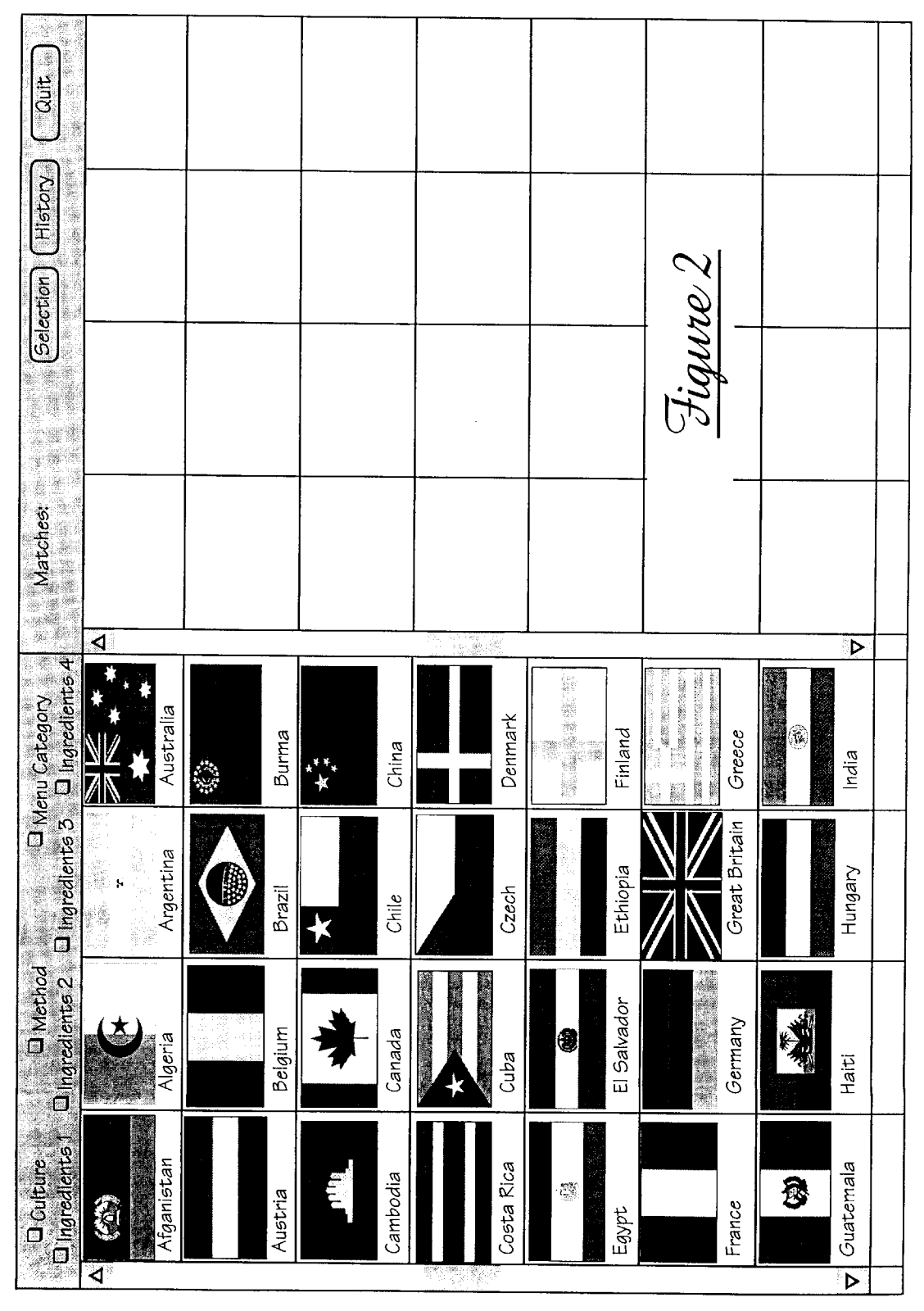

Referring to FIG. 1, a typical display screen 25 is shown at the beginning of the search procedure for a particular dish to be prepared. The screen 25 is split into two halves 27 and 29. Each half 27 and 29 is marked by grids 27a and bordered on the left-hand side by scroll bars 26 and 28, respectively. A horizontal bar 30 at the top of the screen 25 contains buttons that can be activated by the click of mouse 14 (FIG. 1A). The buttons on the left-hand side of the horizontal bar 30 select items according to culture 21, preparation method 22, menu category 23 and ingredients 24. Activation of the culture button 21 (by clicking it with the mouse 14), for example, will cause the left-hand side 27 of the screen 25 to display the different national flags of various nationalities (such as French, Indian, Chinese, American, etc.), as illustrated in FIG. 2. Activating a flag will select the culture of the food to be prepared.

Figure 3:
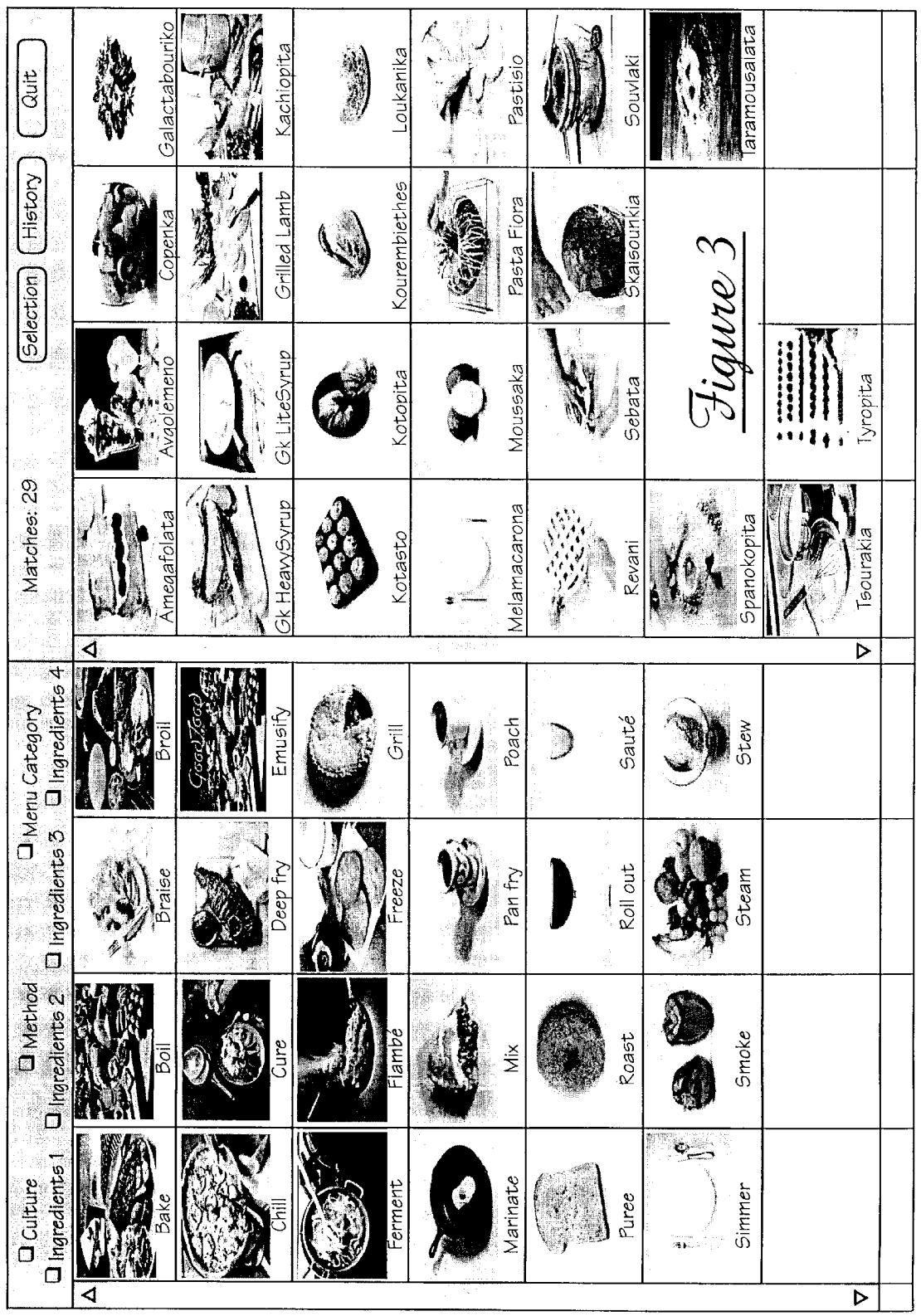

Above the right-hand portion of the screen, the horizontal bar 30 contains buttons labelled matches 31, selection 32, history 33 and quit 34. When activated by the mouse 14, the match button 31 will display (on the right-hand side 29 of the screen 25) those dishes that correspond to the culture selected, as depicted in FIG. 3. The images displayed on the left-hand side 27 of FIG. 3 offer choices of preparation methods in accordance with that culture. The methods of preparation will be automatically revealed after the culture has been selected.

The repeated activation of the selection button 32 allows the program to call up additional dishes to those originally displayed on the right-hand side 29, if those originally displayed were not to the user's liking. The activation of the history button 33 will bring up a text window (not shown) that gives the history of the particular dish selected, such as information about the chef who invented the dish.

Figure 4:
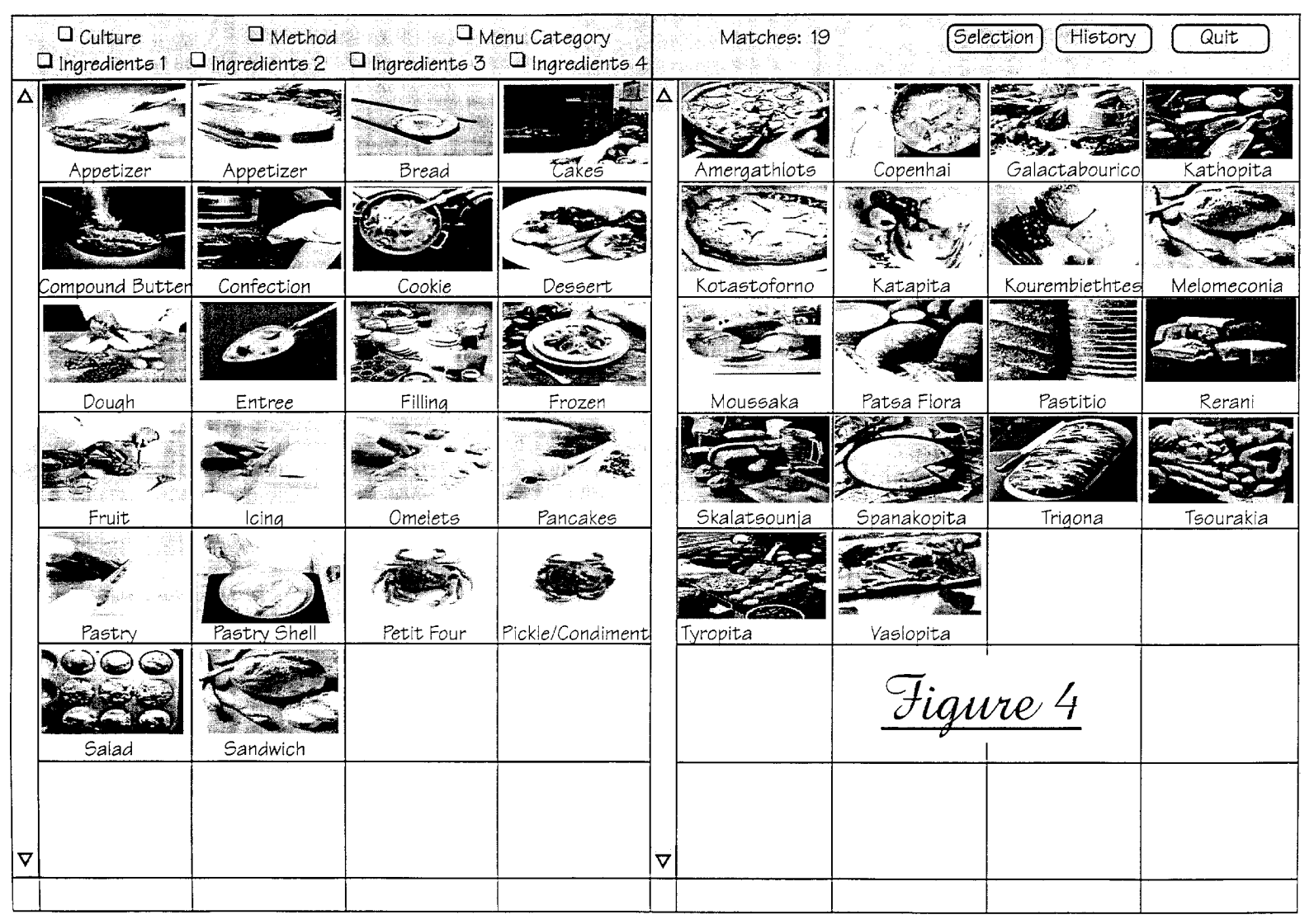

The method buttons shown on the left-hand side 27 of the screen are useful for narrowing the search of dishes displayed on the right-hand side 29. For example, if one desires to bake a cake, selection of the "baking" window on the left-hand side 27 will cause the right-hand side 29 to display only those dishes for a particular culture that are prepared by baking (such as cakes, pastries, rolls, etc.), as illustrated in FIG. 4. The number of dishes displayed will be narrowed by the selection of the "bake" button, for instance, from that of twenty-nine Greek dishes in FIG. 3 to nineteen dishes in FIG. 4.

Figure 5:
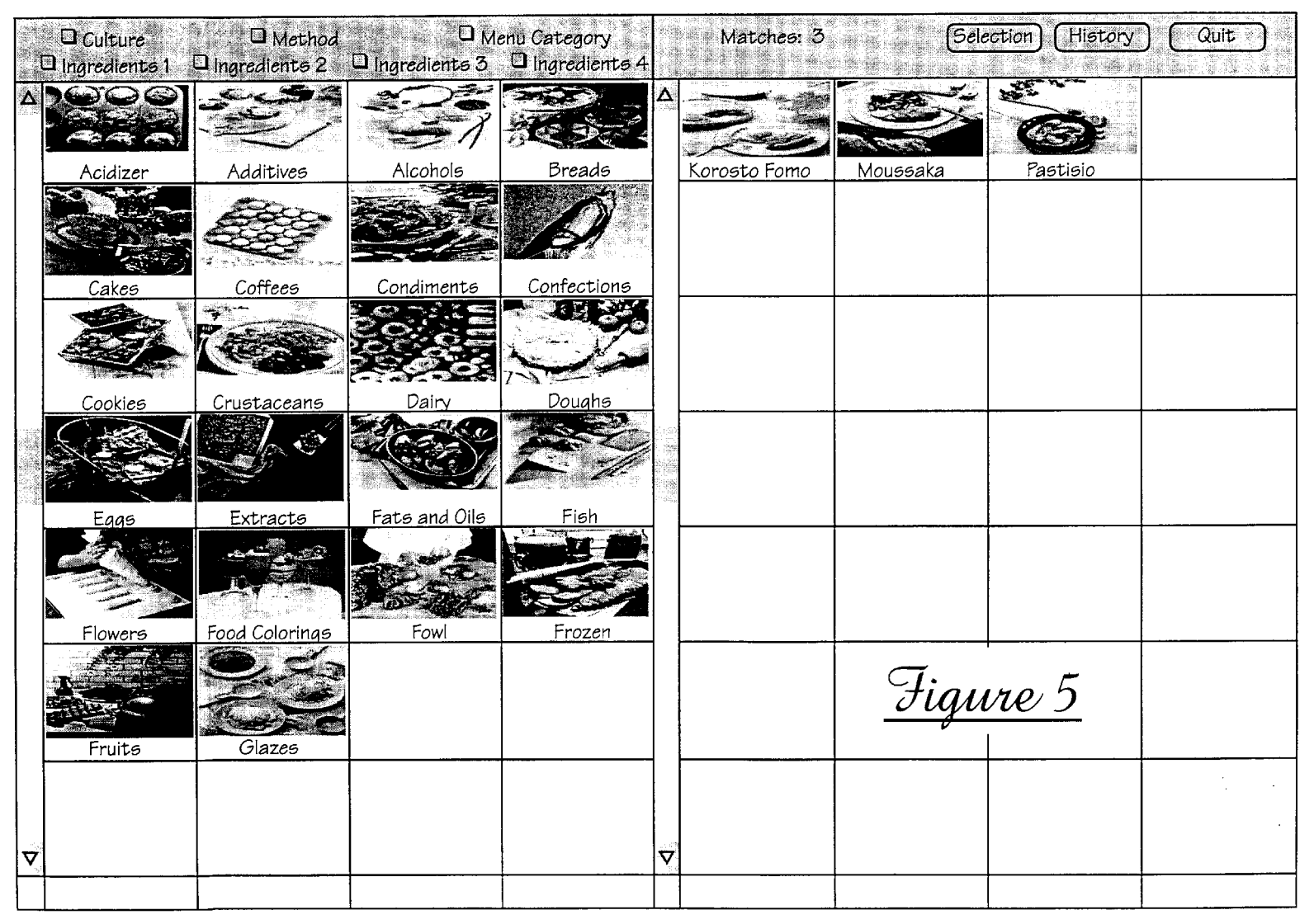

Similarly, the activation of the "menu category" button 23 will display the separate parts of a menu, such as entrees, salads, soups, desserts, etc. Clicking of the entree window on the left-hand side 27 of FIG. 5 will automatically display the baked entrees for the Greek culture originally chosen. Only three baked Greek entrees will now be illustrated on the right-hand side 29 of the screen, as depicted in FIG. 5.

The search now progresses to the "ingredients" portion of the program. Activating one of the ingredient flags (such as "vegetables") will display "moussaka", a Greek baked entree that contains vegetables on the right-hand side of the screen. The program can continue to trim the options if, for example, a particular vegetable is desired, such as eggplant. This part of the program is most useful, since a cook is often limited by ingredients that are seasonally available, or which may be on hand and need to be consumed while still fresh.

Figure 14:
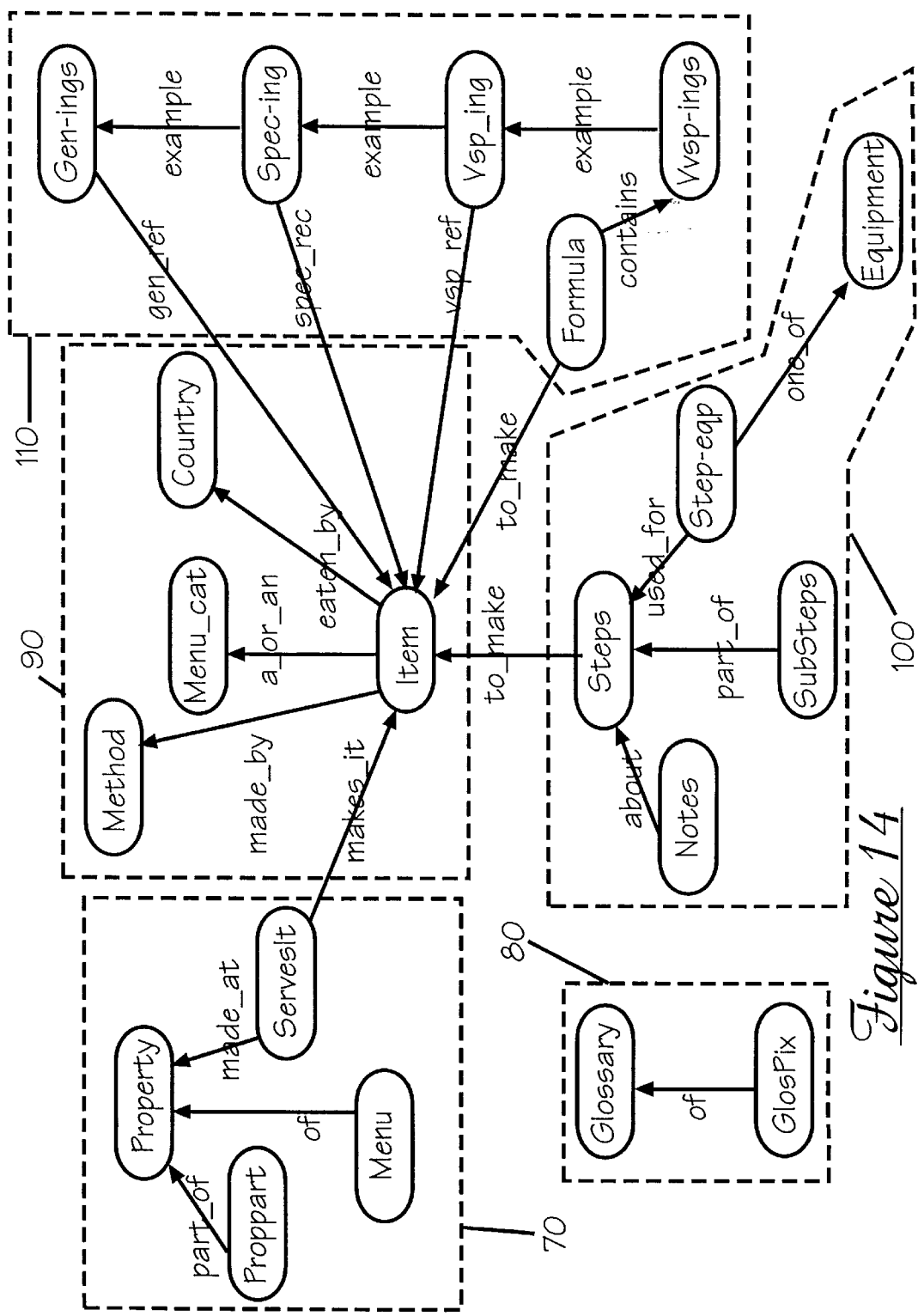

The program of the invention does not contain a default path, as will be hereinafter explained with reference to FIG. 14. Therefore, one can start a search anywhere in the program. That is, a cook can begin the search for a menu dish by first activating the "ingredients" button 24.

The user can terminate the search mode by clicking a particular dish that is displayed on the right-hand side of the screen. The program will now enter the "browse" mode. The browse screen is illustrated in FIG. 6. This screen displays a picture 45 of the dish selected, its national flag 46, as well as information relating to portion size, yield, preparation time, temperature and recipe. The cook can select the measuring system for the recipe, e.g., metric weight, metric volume, English weight or English volume. Ingredients can also be represented by percentage. Each ingredient of a recipe is represented individually. One ingredient can be chosen by metric weight, while another can be represented by English volume. Such flexibility is appreciated when ingredients arrive from foreign countries and contain weights or volumes in foreign units.

Under the picture of the dish 45 is a brief description 46a of it, along with its derivation. The words in the description are linked to a hypertext dictionary. Clicking upon any word will provide its definition.

At the lower left-hand side of the screen is a window containing respective buttons 36, 37, 38, 39 and 40, labelled, respectively, "preparation", "equipment", "comments", "menus" and "properties".

Referring to FIG. 7, the screen is illustrated for the clicking of the "preparation" button 36. By clicking the radio buttons 48 next to each step of the preparation, one can obtain the sub-steps needed for that particular step. The user can also click a special button 50, illustrated on the lower right-hand side of the screen, to access the CD ROM video library 16 shown in FIG. 1. The CD ROM video library can provide video and audio instructions with respect to the preparation of a chosen dish. If only a particular step (buttons 48a through 48h) is desired for video viewing (the baking step 48f, for example), that particular step button is clicked before clicking the button 50. The CD ROM video library 16 is programmable to repeat or terminate the video presentation at any time by using the respective keys "R" or "ESC" on the keyboard 12 (FIG. 1a).

Referring to FIG. 8, a screen is shown displaying the various steps in the preparation of the dish. The CD ROM video library 16 can also be accessed from this screen by clicking button 51 on the lower right-hand side of the screen. The pictures 54 correspond to a view of the preparation's sub-steps (buttons 49a through 49h). A typical sub-step 49 might be the preparation of a sauce such as bechamel (button 48d) for the moussaka. Sub-steps can also be accessed in the CD ROM video library by first clicking on the sub-step picture and then the button 51.

Figure 9:
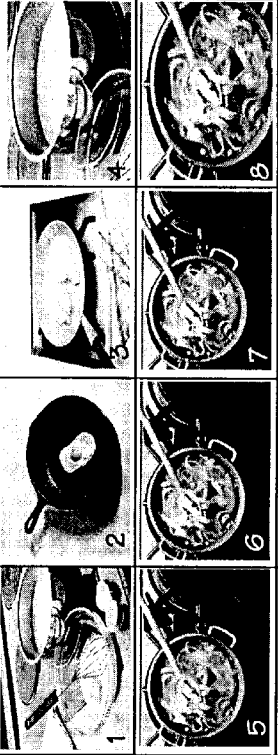

Referring to FIG. 9, a screen of a chosen sub-step is shown, containing helpful hints and advice in the text window 55. The particular sub-step chosen was "stir in milk while whisking".

Figure 10:

Referring to FIG. 10, the screen for displaying the equipment necessary in the preparation of the dish is illustrated. This screen is activated by clicking the "equipment" button 37 (FIG. 9). Clicking the radio buttons 48a through 48h associated with each step will list only the equipment needed for that particular step. Activating any particular piece of equipment by clicking the text with the mouse 14 will produce an explanation of its use in the text box window 56.

Figure 11:
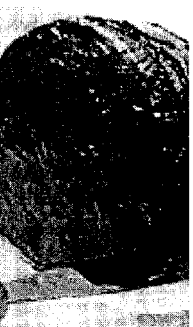

Referring to FIG. 11, a screen is depicted featuring the helpful hints and troubleshooting information which may be invoked by pressing the "comments" button 38 (FIG. 10). Pictures 57 are displayed of both failed and successful results.

Figure 12:
FIG. 12 is a view of the computer screen in which actual menus are illustrated for the dish prepared during the procedures outlined in FIGS. 7 through 11.

Selection of the "menus" button 39 will display a number of restaurant menus serving a particular dish, as shown in FIG. 12. The full menu of that restaurant can be made larger by clicking on the menu 39a in question.

Referring to FIG. 13, images 58 of the restaurants serving a selected dish are illustrated. This screen is accessed by clicking the "properties" button 40.

Other information not shown in the FIGURES can be activated from a horizontal bar 60 disposed at the bottom of the screen, illustrated in FIG. 1. Other information which can be accessed from horizontal bar 60, as shown, includes data pertaining to nutritional content, button 61; searching according to complexity and/or length of time, button 62; "Boolean OR" searches for recipes based on choices (such as broccoli "OR" pine nuts), button 63; matching information about complementary dishes, wines and garnishes, button 64; food requisition for obtaining information on a particular dish by the amount of food needed for making a given number of servings, button 65; downsizing or upsizing the portion size and conversion to percentages, conversion button 66; and conversion of the text to a foreign language, button 67. Referring to FIG. 14, a flow diagram of a portion of the program that describes the accessing of the screens depicted in the foregoing discussion is illustrated. An explanation of the unique window structure is given for a select number of the screens (enough to make obvious the accessing of other information already mentioned). The database structure is accessed by the Graphical User Interface (GUI), using Xwindows programming. The circled items are record types, with labelled arrows denoting the relationships recorded in a hashed table. The "menu"-and-"property" segment 70 of the program relates to that portion of the invention pertaining to the browse methodology.

"Proppart" has four fields: part_of, which is a reference field pointing to property; Part, a field describing which area of the restaurant the image depicts; Text, words describing the image; and Picture, a six-digit numerical field corresponding to the slide and file locations.

The Menu record type corresponds to the Menu button on the Browse screen. It has the following fields: of, which points to Property; Part, which refers to the portion of the menu depicted by the particular picture file; Text, which describes the picture; Picture, a six-digit numerical field corresponding to the slide and file locations; and Meal, which refers to the meal (breakfast, lunch, dinner) for which this particular menu is used.

"ServesIt" is a reference record type that links the record type, Property, with the record type, Item. The fields in ServesIt are: made_at, which points to Property; makes_it, which points to Item; Text (which is accessed by the GUI), holds information about how a particular restaurant prepares the dish in question; and Picture, a six-digit numerical field which accesses an image depicting how the restaurant in question presents its own version of the dish (with its name stored in Item).

"Property" is the record type to which the above three record types point (with the reference fields). It has the following fields: Name, the name of the restaurant being displayed when the user clicks on the Properties button; City, State, Country, pinpointing the restaurant's location; and Text, further information about the restaurant.

The glossary segment 80 is accessed in both the search and browse modes. The user can click on a word or a string of words, and then click on the glossary button to obtain both text and pictorial definitions.

Fields of Glossary are: Name (of concept); and Text (textual information discussing the concept).

Fields of Glospix are: of, a pointer to Glossary; Picture, a six-digit code referring to file and slide; and Text, which contains textual information explaining how the particular picture is a variation on the main theme of the glossary lookup.

The item segment 90 is a portion of the database that stores information relating to the search window. The record types, Method (button 22); Menu_cat (corresponding to the category button 23); and Country (button 21) correspond to three of the four buttons in the upper horizontal bar 30, illustrated in FIG. 1. Clicking on the Method button 22, for example, displays the images of the appropriate items on the right-hand side 29 of the screen, as illustrated in FIG. 4.

Fields of the Method record type are: Prep_method, which holds the name of the method; Text, which holds text describing the method; and Picture, which holds the six-digit number indicating the proper image file to open.

Fields of the Menu_cat record type are: Menu_category, Text, and Picture, corresponding to the fields of Method.

Fields of Country are: Country, Picture and Text, as the above two record types are cited.

The fields of the record type Item, which is the heart of the program, are:
  Name: holds the name of the item;
  Picture: six-digit numerical field holding the file location and slide name of the picture of the finished item;
  Portion_size: the size in ounces of a portion;
  Text: a paragraph or two describing the dish;
  Servings: the number of servings this recipe makes;
  Prep_time: the time it takes to prepare the dish;
  Cook_temp: the temperature required to cook the dish;
  Made_by: a pointer to Method;
  A_or_an: a pointer to Menu_cat;
  Eaten_by: a pointer to Country.

Segment 100 is that portion of the database containing information about production steps, which are divided into more general steps and more specific sub-steps.

Linked to "steps" are Step_eqp and Equipment, which store information about equipment used in the recipe. Also in this portion of the database diagram is the record type Formula, which stores the Item's recipe. This record type is linked to Vvsp_ing and makes it possible to search for Items by their ingredients. "Notes" corresponds to the Comments button 38 displayed on the recipe window of the GUI; "comments" is troubleshooting information related to steps. For example, clicking on Comments and then Present in the recipe window gives presentation ideas. Clicking on Comments and then Mix displays pictures and text of things that can go wrong during the mixing step.

"Steps" has the following fields: Step_key, a combined type field comprising a pointer to Item, as well as a unique name; Text, which contains textual information about the Step; and sequence, a number used by the Recipe Window program to list the steps in sequence.

"Substeps" has these fields: Substep_key, a combined type field comprising a pointer to Steps and a unique name; Text, which contains textual information about the substep; Picture, which contains the address of the image file as well as the slide name; and Substep_num, a sequencing field which the Recipe Window program uses to list the substeps in sequence.

The record type Step_eqp holds information about which equipment is used for the recipe. Clicking on the Equipment button displayed on the lower left-hand side of the recipe window accesses information stored in this field. Fields in Step_eqp are: one_of, a pointer to Equipment; used_for, a pointer to the Steps record type; and Text, textual information about how the piece of equipment is used.

The record type Formula holds the recipe. Its fields are: to_make, a pointer to Item; contains, a pointer to Vvsp_ing; Amount, a numerical field with length 7 and precision 2; and Step_num, a sequencing number with four digits, the first two of which reference the step number and the second two referencing the substep number. This makes it possible to highlight ingredients as the database user clicks on a substep.

"Notes" has these fields: about, a pointer to Steps; Title, the title under the picture; Text, textual information explaining what went right or wrong; and Picture, an address of the picture file or the name of a slide.

Segment 110 of the database program contains information about ingredients. It is accessed by clicking on the ingredients button 24 of the search window, which produces the query of the Gen_ings record type. The ingredient record types are organized and linked to each other hierarchically, making it possible to search for recipes by first selecting a general ingredient category (such as Nuts) and, finding that this yields hundreds or thousands of hits, then becoming more specific (such as Almonds).

"Gen_ings" has these fields: Name, which is the name of the general ingredient category; Text, containing textual information about the general ingredient; and Picture, which is a six-digit code referencing both the file name and the slide number.

Linked to Gen_ings is Gen-ref, a reference record type linking Item and Gen_ings. This makes it possible for Gen_ings to have a number of references to Item without repeating the record and its fields many times (a space-saving organizational tool). The fields in Gen_ref are: contains, pointing to Gen_ings; and to_make, pointing to Item.

"Spec_ing" is the next hierarchical step down. It has the following fields: Name, holds the name of the specific ingredient; Example is a pointer to Gen_ings; Text holds textual information about the specific ingredient; and Picture holds the file address and the slide number.

Linked to Spec_ing is Spec_ref, a reference record type linking Item and Spec_ing. Spec_ref has both function and fields identical to those of Gen_ref (see above).

"Vvsp_ing" is the fourth hierarchical step in increasing ingredient specificity. In addition to the usual information, it also contains nutrient data. Fields of Vvsp_ing are: Name, Example, Text and Picture (described above); Density, which is the conversion factor used to display recipes in English and Metric systems, both by volume and by weight; Calorie_density, which is the calories of the ingredient per gram, Vit_A_density (same); Water_percent; Compl_carb_perc; Total_carp_perc; Sat_fat; Unsat_fat; Calcium; Iron; Potassium; Thiamine; Riboflavin; and Vit_C.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hierarchical, computerized cooking instruction system whereby a user can branch through multiple paths to access cultural information, menu category, ingredients and cooking methods entailed and involved in the preparation of a variety of dishes to be prepared, comprising:

processing means having a hierarchical-type program for accessing cooking information from at least one memory library;

a display operatively connected to said processing means, having a screen for displaying cooking information accessed by said processing means;

input means operatively connected to said processing means for instructing said processing means regarding types of cooking information to be accessed; and said at least one memory library comprising a video library memory means connected to said processing means, said video library memory means being accessible by said processing means to supply cooking information in animated form.

2. The hierarchical, computerized cooking instruction system in accordance with claim 1, wherein said video library memory means comprises a CD ROM video memory system.

3. The hierarchical, computerized cooking instruction system in accordance with claim 2, wherein said processing means further comprises at least one speaker operatively connected thereto for providing sound for sound and visual information retrieved from said CD ROM video memory system.

4. A hierarchical, computerized cooking instruction system whereby a user can branch through multiple paths to access cultural information, menu category, ingredients and cooking methods entailed and involved in the preparation of a variety of dishes to be prepared, comprising:

processing means having a hierarchical-type program for accessing cooking information from at least one memory library;

a display operatively connected to said processing means, having a screen for displaying cooking information accessed by said processing means;

at least one speaker operatively connected to said processing means for providing audio perception of cooking information accessed by said processing means;

input means operatively connected to said processing means for instructing said processing means regarding types of cooking information to be accessed; and said at least one memory library comprising an audio library memory means connected to said processing means, said audio library memory means being accessible by said processing means to supply cooking information in audio form.

5. The hierarchical, computerized cooking instruction system in accordance with claim 4, wherein said audio library memory means comprises a CD ROM audio memory system.

\* \* \* \* \*